US012138923B2

(12) United States Patent
Bridges et al.

(10) Patent No.: US 12,138,923 B2
(45) Date of Patent: Nov. 12, 2024

(54) DYNAMIC MODULATING VOLTAGE ADJUSTMENT

(71) Applicant: DOMINO UK LIMITED, Cambridge (GB)

(72) Inventors: Richard Thomas Calhoun Bridges, Cambridge (GB); Justin Chase, Cambridge (GB); Stuart Mark Walkington, Cambridge (GB)

(73) Assignee: DOMINO UK LIMITED (GB)

( * ) Notice: Subject to any disclaimer, the term of this patent is extended or adjusted under 35 U.S.C. 154(b) by 34 days.

(21) Appl. No.: 18/267,434

(22) PCT Filed: Dec. 15, 2021

(86) PCT No.: PCT/EP2021/086016

§ 371 (c)(1),
(2) Date: Jun. 14, 2023

(87) PCT Pub. No.: WO2022/129242

PCT Pub. Date: Jun. 23, 2022

(65) Prior Publication Data

US 2024/0051293 A1 Feb. 15, 2024

(30) Foreign Application Priority Data

Dec. 16, 2020 (GB) ..................................... 2019897

(51) Int. Cl.
*B41J 2/115* (2006.01)

(52) U.S. Cl.
CPC .................................... *B41J 2/115* (2013.01)

(58) Field of Classification Search
CPC ..... B41J 2/12; B41J 2/075; B41J 2/125; B41J 2/08; B41J 2/085; B41J 2002/022; B41J 2002/033; B41J 2/115; B41J 2/03; B41J 2/025; B41J 2/035; B41J 2/045
See application file for complete search history.

(56) References Cited

U.S. PATENT DOCUMENTS

2001/0040599 A1* 11/2001 Dunand ..................... B41J 2/08 347/78
2008/0284827 A1* 11/2008 Fagerquist ................. B41J 2/03 347/77
2010/0033543 A1* 2/2010 Piatt ......................... B41J 2/115 347/77

* cited by examiner

*Primary Examiner* — Kristal Feggins
(74) *Attorney, Agent, or Firm* — Bochner PLLC; Andrew D Bochner

(57) ABSTRACT

A continuous inkjet printer (50) has an ink droplet generator (52) and a controller (58) that varies a modulating voltage applied to the ink droplet generator (52) and measures corresponding breakup times of a jet of ink into ink droplets to obtain a portion of a characteristic of breakup time against modulating voltage. The controller (58) obtains a variation range, varies the modulating voltage over the variation range to obtain the portion of the characteristic, calculates a gradient from the portion of the characteristic, compares the gradient with a predetermined gradient and, depending on whether the calculated gradient is less than or greater than the predetermined gradient, generates an adjusted variation range that is displaced in a first sense or a second, opposite sense, respectively, relative to the variation range.

15 Claims, 4 Drawing Sheets

| Index Numbers | DAC level | V - mod | Test point low | Test point high | Buffer Size |
|---|---|---|---|---|---|
| 0 | 0 | 0 | 0 | 0 | 0 |
| 1 | 1022 | 1 | 0 | 0 | 0 |
| 2 | 1021 | 2 | 0 | 0 | 0 |
| 3 | 1020 | 3 | 0 | 0 | 0 |
| 165 | 829 | 135 | 159 | 171 | 13 |
| 166 | 827 | 136 | 160 | 172 | 13 |
| 167 | 825 | 137 | 161 | 173 | 13 |
| 168 | 823 | 138 | 162 | 174 | 13 |
| 169 | 821 | 139 | 163 | 176 | 14 |
| 170 | 819 | 140 | 164 | 177 | 14 |
| 171 | 817 | 140.8 | 164 | 178 | 15 |
| 172 | 815 | 141.6 | 165 | 179 | 15 |
| 173 | 813 | 142.5 | 166 | 180 | 15 |
| 174 | 811 | 143.3 | 167 | 181 | 15 |
| 175 | 809 | 144.1 | 168 | 182 | 15 |
| 176 | 807 | 144.9 | 168 | 183 | 16 |
| 177 | 805 | 145.8 | 169 | 184 | 16 |
| 178 | 803 | 146.6 | 170 | 185 | 16 |
| 179 | 801 | 147.4 | 171 | 186 | 16 |
| 180 | 799 | 149.2 | 172 | 187 | 16 |
| 181 | 797 | 149.1 | 173 | 188 | 16 |
| 182 | 795 | 149.9 | 174 | 189 | 16 |
| 183 | 793 | 150.7 | 175 | 190 | 16 |
| 184 | 791 | 151.5 | 176 | 191 | 16 |
| 185 | 789 | 152.4 | 177 | 192 | 16 |

200

210

FIG. 4

DYNAMIC MODULATING VOLTAGE ADJUSTMENT

FIELD OF THE INVENTION

This invention relates to a continuous inkjet (CIJ) printer, to a method of operating a CIJ printer, and to a computer program executable by a CIJ printer to carry out such a method.

BACKGROUND TO THE INVENTION

A CIJ printer typically has an ink droplet generator including an electromechanical transducer, a driver for applying a periodic, typically sinusoidal, modulating voltage to the transducer to cause a jet of ink ejected by the ink droplet generator to break up into a stream of ink droplets at a breakup time after ejection from the ink droplet generator, and a controller for establishing an operating value of the modulating voltage.

A CIJ printer typically also has a charge electrode for applying electrical charges to selected ones of the ink droplets, electrostatic deflection plates for deflecting the charged ink droplets onto a print substrate, and a charge detector for measuring electrical charges applied to the ink droplets.

The charge detector is used for "phasing", where sequences of phasing signals, smaller than the charging signals used for charging ink droplets that are to be used for printing, for example, of half the duration of the charging signals, are applied to the charge electrode with increasing phase shifts relative to the modulating voltage. By measuring the resulting electrical charges on ink droplets, an optimal phase relationship between the charging signals applied to the charge electrode and the modulating voltage can be identified.

It will be appreciated that the optimal phase relationship depends upon the breakup time, that an indication of the breakup time can be obtained from the optimal phase relationship, but that determination of the optimal phase relationship, i.e., phasing, can only be carried out using ink droplets that are not required for printing.

EP 0 386 049 discloses a CIJ printer that can obtain a portion of a characteristic of a breakup time parameter indicative of the breakup time against a modulating voltage amplitude, identify a modulating voltage amplitude corresponding to a point on the portion with a predetermined gradient, and establish an operating value of the modulating voltage amplitude that is offset by a predetermined amount from the identified modulating voltage amplitude.

EP 0 386 049 teaches that the operating value of the modulating voltage amplitude might be established once every 2 to 10 minutes for an initial warm-up and settling period, and less frequently, typically once every 30 minutes to 2 hours, once the operating conditions have stabilised.

EP 2 209 636 is concerned with a similar CIJ printer, which differs in that it establishes an operating value of the modulating voltage amplitude that corresponds to the point on the portion with the predetermined gradient.

EP 2 209 636 suggests that tracking of the modulating voltage amplitude might be undertaken between the printing of characters or images on to an object, or after a batch of images or characters has been printed. It does not explain how such tracking might be achieved when relatively few ink droplets that are not required for printing are available, as is the case when a CIJ printer is used to print on closely-spaced products on a fast-moving production line.

SUMMARY OF THE INVENTION

According to a first aspect of the invention there is provided a continuous inkjet printer comprising an ink droplet generator including an electromechanical transducer, a driver operable to apply a periodic modulating voltage to the transducer to cause a jet of ink ejected by the ink droplet generator to break up into a stream of ink droplets at a breakup time after ejection from the ink droplet generator, and a controller operable to vary a modulating voltage parameter of the modulating voltage and measure corresponding values of a breakup time parameter indicative of the breakup time to obtain a portion of a characteristic of the breakup time parameter against the modulating voltage parameter, wherein the controller is operable to obtain a variation range, to vary the modulating voltage parameter over the variation range to obtain the portion of the characteristic, to calculate a gradient from the portion of the characteristic, to compare the calculated gradient with a predetermined gradient and, if the calculated gradient is less than the predetermined gradient, to generate an adjusted variation range that is displaced relative to the variation range in a first sense, or, if the calculated gradient is greater than the predetermined gradient, to generate an adjusted variation range that is displaced relative to the variation range in a second sense, opposite to the first sense.

The invention can provide a CIJ printer that may adjust a modulating voltage parameter in response to a change in an operating condition of the printer, such as ambient temperature, humidity or ink viscosity, without waiting for completion of a printing operation such as printing of characters or images on to an object, or printing of a batch of images or characters.

Preferably the electromechanical transducer is a piezoelectric element and/or the modulating voltage parameter is an amplitude of the modulating voltage.

Preferably, the controller is operable to calculate the gradient from the portion of the characteristic by identifying a line of best fit to the portion and calculating the gradient of the line of best fit.

While it is envisaged that the breakup time parameter could be a breakup distance, i.e., a distance from a nozzle of the ink droplet generator at which ink droplets separate from the jet of ink, or a phase shift between the modulating voltage and a signal for applying electrical charges to the ink droplets, preferably the breakup time parameter is a breakup time at least indicative of a time after which ink jetted from a nozzle of the ink droplet generator separates into an ink droplet.

Preferably, the controller is operable to store the adjusted variation range in a variation range memory of the printer, and to obtain the variation range from the variation range memory.

The controller thus operates iteratively, on each iteration obtaining a variation range from the variation range memory, which variation range has been generated by the previous iteration, obtaining the portion of the characteristic indicated by the variation range, calculating the gradient from the portion of the characteristic, comparing the calculated gradient with the predetermined gradient, and generating an adjusted variation range and storing the adjusted variation range in the variation range memory for use by the next iteration.

It will be apparent that the controller operates continuously to vary the modulating voltage parameter about a point on the characteristic that has the predetermined gradient, which point changes in response to changes in operating conditions of the printer.

The variation range may have a constant size, e.g., 10 V.

Preferably, however, the variation range has a size that varies with the portion of the characteristic over which the modulating voltage parameter varies.

Preferably, the variation range has a size that increases with the modulating voltage amplitudes that constitute the portion of the characteristic.

For example, for modulating voltage amplitudes around 50 V, the size of the variation range might be 7 V, whereas for modulating voltage amplitudes around 150 V, the size of the variation range might be 12 V.

FIG. 1 shows schematically first 10 and second 12 characteristics of breakup time (y-axis) against modulating voltage amplitude (x-axis) for respective first and second operating conditions of a printer.

Reference numeral 14 denotes a portion of the first characteristic 10 where a magnitude of the gradient of the characteristic decreases from a first, positive value to zero, then increases from zero to a second, negative value. Satisfactory printer operation can be expected along the sub-portion 16 of the portion 14 of the first characteristic 10 in which the magnitude of the gradient decreases from the first, positive value to a second, non-zero, positive value. Reference numerals 18 and 20 denote a corresponding portion and sub-portion, respectively, of the second characteristic 12.

The portion 14 can be seen to correspond to smaller modulating voltage amplitudes and a smaller range of modulating voltage amplitudes than the portion 18. That is to say, under the operating condition of the first characteristic 10, a relatively low modulating voltage amplitude would be required, and relatively small changes of modulating voltage amplitude would be required to obtain a given change in breakup time, whereas under the operating condition of the second characteristic 12, a relatively high modulating voltage amplitude would be required, and relatively large changes of modulating voltage amplitude would be required to obtain the given change in breakup time.

Increasing the size of the variation range with the modulating voltage amplitudes that constitute the portion of the characteristic enables operation of the controller over a wide range of operating conditions of the printer.

The driver may advantageously include a digital-to-analog converter (DAC). As is common for these devices, the DAC has a non-linear response, such that a given increase in a binary input value to the DAC does not produce the same increase in an output voltage of the DAC across the operating range of the DAC.

Preferably, therefore, the controller is configured to apply binary input signals to the DAC, which binary input signals are selected from a subset of the set of binary input signals receivable by the DAC, the subset being chosen such that output voltages produced by the DAC in response to the binary input signals differ from one another by approximately equal amounts.

Preferably, the subset is chosen such that output voltages produced by the DAC in response to the binary input signals differ from one another by an amount as close to 1 V as possible.

Where the controller is configured to apply binary input signals selected from the subset to the DAC, the effect of non-linear response of the DAC on the operation of the controller is reduced.

The printer may advantageously include a memory containing a lookup table specifying variation range sizes of the portions of the characteristic.

Preferably, each entry of the lookup table includes a value of the modulating voltage parameter and an indication of those lookup table entries of which the values of the modulating voltage parameter constitute the portion of the characteristic.

Preferably, each entry of the lookup table includes a modulating voltage amplitude.

Preferably, each entry of the lookup table includes an index number that identifies the entry, a value of the modulating voltage parameter, and first and second index numbers defining respective first and second ends of the portion of the characteristic, the portion of the characteristic being defined by the values of the modulating voltage parameter of the lookup table entries identified by the first and second index numbers.

Preferably, the entries of the lookup table are ordered by the values of the modulating voltage parameter and each entry of the lookup table includes an indication of first and second entries defining respective first and second ends of a portion of the lookup table, the values of the modulating voltage parameter of the lookup table entries of the portion of the lookup table constituting the portion of the characteristic.

The controller may advantageously be operable, for each value of the modulating voltage parameter, to measure the corresponding breakup time parameter value at least twice and calculate an average breakup time parameter value from the measured breakup time parameter values.

In this way, the effect of any inaccurate measurement of the breakup time parameter value on the gradient calculated from the portion of the characteristic is reduced.

As explained above, while the CIJ printer of the invention is capable of varying the value of the modulating voltage parameter at any time, including even during ejection of a sequence of ink droplets used for printing, it can only measure a breakup time parameter value when it is not printing, because the ink droplets used to measure the breakup time parameter value cannot be used for printing.

A CIJ printer typically prints messages on products passing the printer on a production line as a series of strokes, with ink droplets not used for printing being ejected from the ink droplet generator between strokes and between messages. The droplets ejected from the ink droplet generator between strokes and between messages are available for use for phasing, and therefore for use to measure the breakup time parameter value.

It will be appreciated that the faster the production line moves, the fewer droplets are ejected between strokes and messages and the fewer are the opportunities for phasing and measuring the breakup time parameter value.

Advantageously, therefore, the printer may be configured to receive an input indicative of a speed of a production line, and to vary a number of times that a breakup time parameter value corresponding to a value of the modulating voltage parameter is measured in dependence upon the input.

In this way, when the printer is used to print on products on a relatively slow-moving production line, and plenty of ink droplets are available between strokes and messages for measuring a breakup time parameter value, the printer can make a relatively large number of measurements and average the measurements, and the effect of any inaccurate measurement is reduced correspondingly, whereas when the printer is used to print on products on a relatively fast-moving production line, and relatively few ink droplets are available between strokes (if any) and messages for measuring the breakup time parameter value, the printer can make a smaller number of, or even only single measurements of, the breakup time parameter value, at the risk of any inaccurate measurement affecting calculation of the gradient from the portion of the characteristic.

According to a second aspect of the invention there is provided a method of operating a continuous inkjet printer, the method comprising applying a periodic modulating voltage to an electromechanical transducer of an ink droplet generator to cause a jet of ink ejected by the ink droplet generator to break up into a stream of ink droplets at a breakup time after ejection from the ink droplet generator, varying a modulating voltage parameter of the modulating voltage and measuring corresponding values of a breakup time parameter indicative of the breakup time to obtain a portion of a characteristic of the breakup time parameter against the modulating voltage parameter, wherein the method comprises obtaining a variation range, varying the modulating voltage parameter over the variation range to obtain the portion of the characteristic, calculating a gradient from the portion of the characteristic, comparing the calculated gradient with a predetermined gradient and, if the calculated gradient is less than the predetermined gradient, generating an adjusted variation range that is displaced relative to the variation range in a first sense, or, if the calculated gradient is greater than the predetermined gradient, generating an adjusted variation range that is displaced relative to the variation range in a second sense, opposite to the first sense.

According to a third aspect of the invention there is provided a computer program executable by a continuous inkjet printer to cause the printer to carry out the method of the second aspect of the invention.

BRIEF DESCRIPTION OF THE DRAWINGS

The invention will now be described, by way of example, with reference to the attached drawing figures, in which:

FIG. 4 is a portion of a lookup table used by a computer program executed by the CIJ printer of FIG. 2.

DETAILED DESCRIPTION OF AN EMBODIMENT

Figure 2:
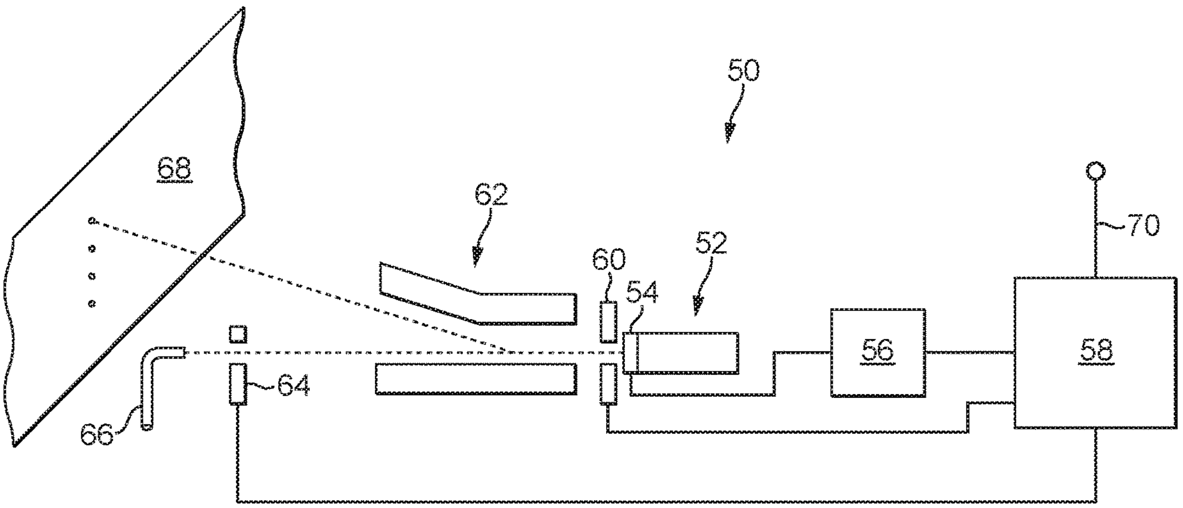
FIG. 2 is a schematic diagram of a CIJ printer in accordance with the invention.

The CIJ printer 50 of FIG. 2 comprises an ink droplet generator 52 including an electromechanical transducer in the form of a piezoelectric element 54, a driver 56 including a digital-to-analog converter (DAC) and power amplifier and operable to apply a sinusoidal modulating voltage to the piezoelectric element 54 to cause a jet of ink ejected by the ink droplet generator 52 to break up into a stream of ink droplets at a breakup time after ejection from the ink droplet generator 52. A controller in the form of a programmed computer 58 is operable to control the DAC of the driver 56 to vary the amplitude of the modulating voltage applied to the piezoelectric element 54.

The CIJ printer 50 further comprises a charge electrode 60 for applying electrical charges to selected ones of the ink droplets generated by the ink droplet generator 52, a pair of electrostatic deflection plates 62 for deflecting charged ink droplets, a charge detector 64 and a gutter 66 for collecting ink droplets that are not used for printing.

In use of the CIJ printer, ink droplets passing through charge electrode 60 that are to be used for printing are charged in accordance with charging signals caused to be applied to the charge electrode 60 by the computer 58. The charged ink droplets are deflected away from a lower deflection plate towards an upper deflection plate of the deflection plates 62 and impinge on a substrate 68, typically part of the packaging of a product moving along a production line.

Uncharged droplets continue undeflected through the charge detector 64 into the gutter 66, from which they are returned to an ink system (not shown) of the printer 50.

The CIJ printer 50 includes an input 70 for connection to a rotary encoder of a conveyor of a production line to provide an indication to the printer of a speed of movement of the production line.

Phasing of the printer 50 takes place on start up of the printer and from time to time, typically every 30 ms unless a printing operation prevents this, during operation of the printer.

In the phasing operation, sequences of eight ink droplets ejected from the ink droplet generator are charged by phasing signals applied to the charge electrode 60. Sixteen sequences of eight droplets are charged in this way, with the phasing signals used to charge each sequence of eight ink droplets being delayed by a sixteenth of the period of the modulating voltage relative to the previous sequence of eight ink droplets.

The phasing signals result in smaller charges being applied to the ink droplets used for phasing than the charges applied to the ink droplets used for printing. The ink droplets used for phasing are not significantly deflected by the deflection plates 62 and pass through the charge detector 64 into the gutter 66.

The phase shift of the phasing signal that results in the largest charges on a sequence of eight ink droplets is used to determine the phase shift of charging signals relative to the modulating voltage for ink droplets that are used for printing. That is, the phase shift of the phasing signal that results in the largest charges detected on the ink droplets used for phasing is also used for the charging signals applied to the ink droplets used for printing.

The breakup time parameter indicative of the breakup time is measured as follows.

A clock is started when the first phasing signal of the sequence of eight phasing signals is applied to the charge electrode 60. As the eight charged ink droplets approach, pass through and move away from the charge detector 64, the charge detector 64 produces an output voltage that swings from an initial value in a first direction, peaks and swings back through the initial value in a second, opposite direction, before peaking and swinging back to the initial value.

The output voltage of the charge detector 64 is monitored and the clock is stopped when the output voltage exceeds a threshold voltage after swinging back through the initial value in the second, opposite direction.

The clock count is taken to be the breakup time parameter indicative of the breakup time.

By varying the amplitude of the modulating voltage applied to the piezoelectric element 54 and storing the clock counts between the first phasing signal and the charge detector output voltage crossing the threshold voltage, as described above, the printer obtains a breakup time against modulating voltage amplitude characteristic.

The printer identifies a point on the characteristic that has a predetermined gradient, e.g., 0.2 μs/V, identifies the modulating voltage amplitude of the characteristic at that point, and sets the modulating voltage amplitude to an initial value around 7 V less than the identified modulating voltage amplitude.

This is the automodulation process described in EP 0 386 049, the disclosure of which is incorporated by reference as if disclosed in this description.

The operation of the printer 50 as described so far is largely conventional.

The method of operation of the CIJ printer of the invention is as follows.

In the following description, the expression "modulating voltage amplitude operating point" will be abbreviated to "voltage operating point".

The description is accompanied by numerical examples to illustrate the operation of the printer.

Figure 3A:
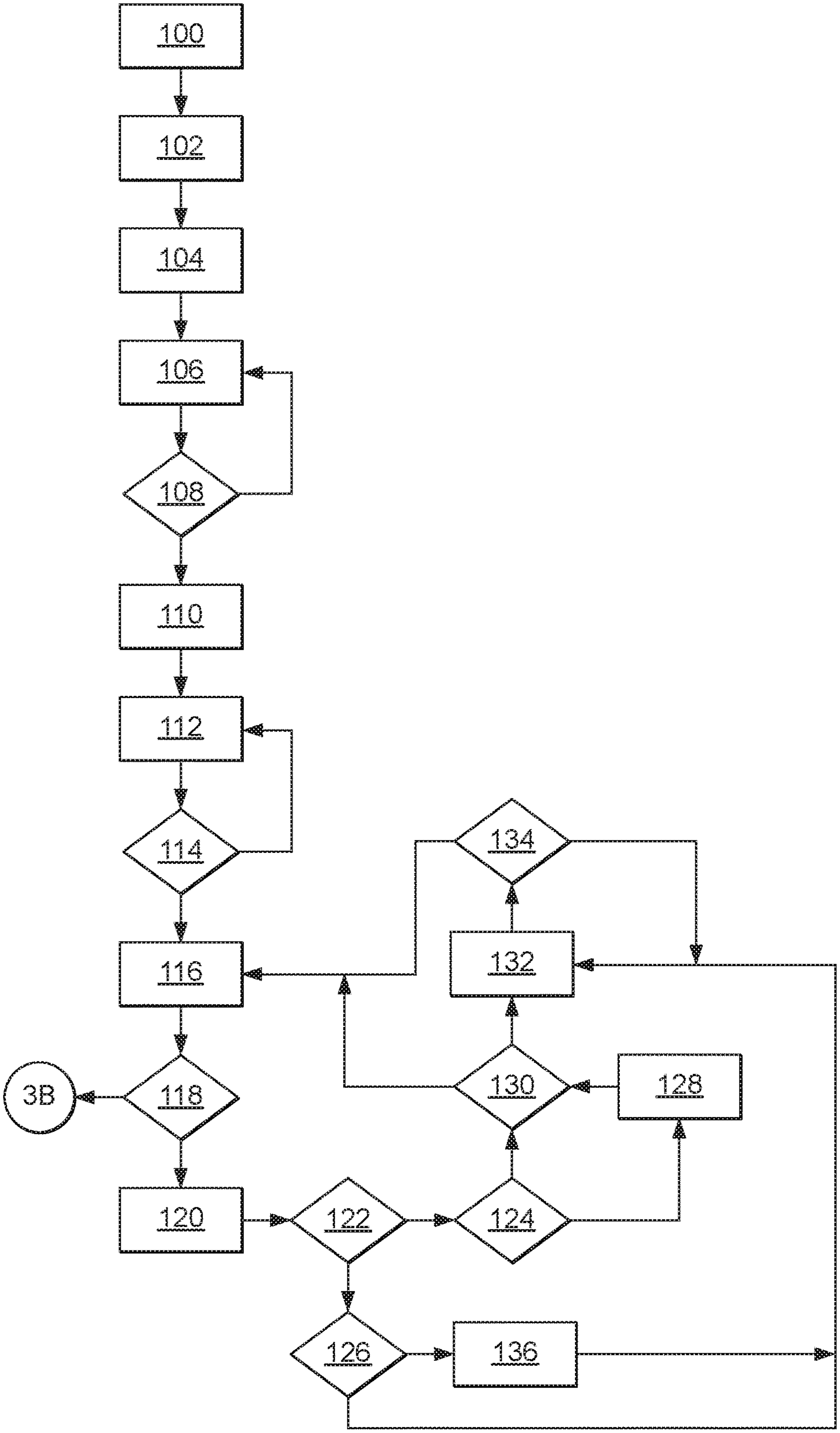
FIGS. 3A and 3B are parts of a flow chart of a method of operation of the CIJ printer of FIG. 2.

With reference to FIG. 3A, having established an initial voltage operating point by automodulation at step 100, at step 102 the computer 58 executes the computer program of the invention to identify a lookup table entry that includes the initial voltage operating point. A portion of the lookup table is shown in FIG. 4, denoted by reference numeral 200.

The lookup table is a list of voltage operating points of the printer, each identified by a lookup table entry index number. The portion 200 of the lookup table shown in FIG. 4 shows lookup table entries index numbers 165 to 185.

As a numerical example, if the initial voltage operating point is 143.3 V, the computer 58 finds the lookup table entry that includes the voltage operating point value of 143.3 V. The lookup table entry has an index number of 174 in the portion 200 of the lookup table shown in FIG. 4. It will be apparent that the computer can find lookup table entry index number 174 by its index number if the index number is passed with the initial voltage operating point value from step 100 to step 102, rather than the computer looking for the voltage operating point value.

As well as an index number, each lookup table entry has fields for a DAC level, the voltage operating point value, a test point low index number, a test point high index number and a buffer size.

As can be seen from FIG. 4, for lookup table entry index number 174, denoted by reference numeral 210, the DAC level field has a value of 811, the voltage operating point field has a value of 143.3 V, the test point low and high index number fields have values of 167 and 181, respectively, and the buffer size field has a value of 15.

At step 104 the computer 58 stores the breakup time corresponding to the initial voltage operating point in a buffer memory of the computer and obtains the test point low index number of 167 and the test point high index number of 181 from the lookup table entry index number 174. (The breakup time corresponding to the initial voltage operating point is obtained during the automodulation process.)

At step 106 the computer 58 looks up the next voltage operating point below the current voltage operating point.

Returning to the numerical example, for the initial voltage operating point of 143.3 V, as specified in lookup table entry index number 174, the next voltage operating point below the current voltage operating point is 142.5 V, as specified in lookup table entry index number 173.

The computer applies the DAC level value of the lookup table entry that includes the next voltage operating point below the current voltage operating point to the DAC of the driver 56, which causes a modulating voltage with the amplitude of the next voltage operating point below the current voltage operating point to be applied to the piezoelectric element 54 of the ink droplet generator 52.

In the numerical example, the computer applies the DAC level of 813 specified by lookup table entry index number 173 to the DAC, which causes a modulating voltage with an amplitude of 142.5 V to be applied to the piezoelectric element 54.

Phasing is carried out as explained above to identify the phase shift of the phasing signals relative to the modulating voltage that maximises the magnitudes of charges on the ink droplets used for phasing. The breakup time corresponding to the modulating voltage amplitude is measured as explained above.

Phasing and measurement of the breakup time may be carried out several times depending on a speed of a production line on which the printer is used, and the breakup time calculated from the average of the breakup time measurements, to reduce the effect of any inaccurate breakup time measurements. The breakup time is stored in the buffer memory of the computer 58.

At step 108 the computer 58 determines whether the current voltage operating point is that specified by the lookup table entry identified by the test point low index number. If not, operation returns to step 106.

In the numerical example, the computer determines whether the current voltage operating point is that specified by lookup table entry index number 167, i.e., 137 V, as lookup table entry index number 167 is specified by lookup table entry index number 174, which contains the initial voltage operating point value of 143.3 V.

Otherwise, at step 110 the computer clears all of the breakup times other than the breakup time corresponding to the current voltage operating point from the buffer memory.

In the numerical example, the breakup time stored in the buffer memory is that corresponding to the voltage operating point of 137 V.

It may seem surprising that, having measured the breakup times corresponding to the voltage operating points between the initial voltage operating point and the voltage operating point specified by the lookup table entry identified by the test point low index number, and stored them in the buffer memory, they are immediately cleared from the buffer memory. The reason for this is to avoid a large change in the voltage operating point, which would occur if the modulating voltage amplitude were to be changed in a single step from the initial voltage operating point to the voltage operating point specified by the lookup table entry identified by the test point low index number. Such a large change could result in unstable operation of the printer.

The computer sets a direction variable to indicate that increasing values of the modulating voltage amplitude are to be used to populate the buffer memory with breakup times.

The computer looks up the next voltage operating point above the current voltage operating point.

Returning to the numerical example, the current voltage operating point is 137 V, as specified by lookup table entry index number 167 identified by the test point low index number. The next voltage operating point above the current voltage operating point is 138 V, as specified in lookup table entry index number 168.

The computer causes a modulating voltage with an amplitude of the next voltage operating point above the current voltage operating point to be applied to the piezoelectric element 54 and carries out phasing and measurement of the breakup time at the new voltage operating point. The computer stores the breakup time in the buffer memory.

At step 112 the computer 58 looks up the next voltage operating point above the current voltage operating point.

Again, the computer causes a modulating voltage with an amplitude of the next voltage operating point to be applied to the piezoelectric element 54 and carries out phasing and measurement of the breakup time at the new voltage operating point. The computer stores the breakup time in the buffer memory.

At step 114 the computer determines whether the current voltage operating point is that of the lookup table entry identified by the test point high index number. If not, operation returns to step 112.

In the numerical example, the computer determines whether the current voltage operating point is that specified by lookup table entry index number 181, i.e., 149.1 V, as lookup table entry index number 181 is specified by lookup table entry index number 174, which contains the initial voltage operating point value of 143.3 V.

Otherwise, at step 116 the computer calculates a best fit line to the breakup times stored in the buffer memory.

In the numerical example, the buffer memory contains the breakup times corresponding to the voltage operating points specified by lookup table entries index numbers 167 to 181.

The computer calculates the gradient of the best fit line.

At step 118 the computer compares the calculated gradient with the predetermined gradient of 0.2 μs/V.

Figure 1:
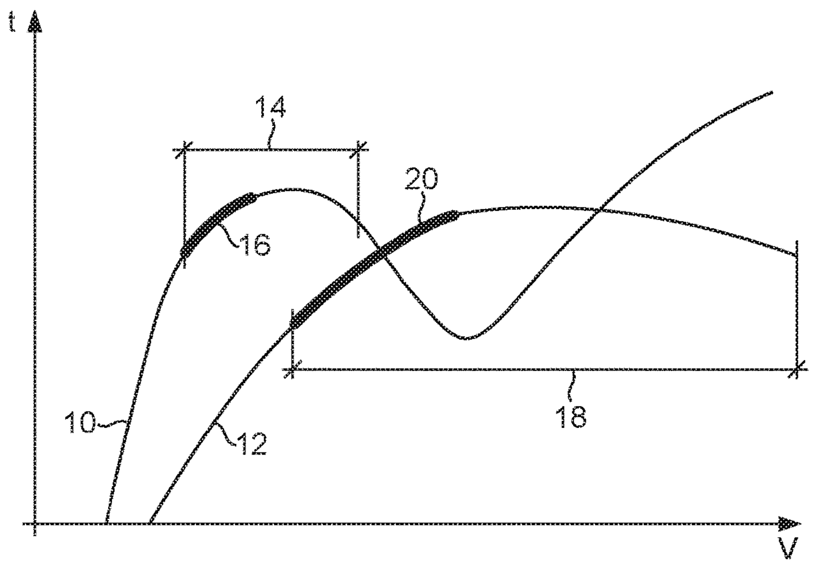
FIG. 1 is a schematic graph of breakup time against modulating voltage amplitude characteristics for two operating conditions of a CIJ printer.

If the gradient of the best fit line is greater than the predetermined gradient, this indicates that an operating condition of the printer, such as ambient temperature, humidity or ink viscosity, has changed so as to stretch the breakup time against modulating voltage amplitude characteristic along the x-axis, i.e., the characteristic has changed away from the first characteristic 10 shown in FIG. 1 towards the second characteristic 12. Where the gradient of the best fit line is greater than the predetermined gradient, operation proceeds to step 120, described below with reference to FIG. 3A.

If at step 118 the gradient of the best fit line is less than the predetermined gradient, this indicates that the breakup time against modulating voltage amplitude characteristic has been compressed along the x-axis, i.e., the characteristic has changed away from the second characteristic 12 shown in FIG. 1 towards the first characteristic 10. Where the gradient of the best fit line is less than the predetermined gradient, operation proceeds to step 150, described below with reference to FIG. 38.

Dealing first with the case that the gradient of the best fit line is greater than the predetermined gradient, at step 120 the computer 58 looks up the next voltage operating point above the initial or current reference voltage operating point, as the case may be.

In the numerical example, the next voltage operating point above the initial operating point of 143.3 V is 144.1 V, as specified by lookup table entry index number 175.

The computer stores the next voltage operating point above the initial or current reference voltage operating point as a reference voltage operating point.

It is worth emphasising that the reference voltage operating point does not immediately determine the amplitude of the modulation voltage applied to the piezoelectric element 54. Rather, the reference voltage operating point establishes a lookup table entry of which the test point low and high index number values and buffer size value determine the behaviour of the printer until a next reference voltage operating point is selected by the computer.

In the numerical example, therefore, the computer stores the reference voltage operating point of 144.1 V specified by lookup table entry index number 175, which specifies test point low and high index number values of 168 and 182 and a buffer size of 15.

The computer obtains the test point low index number and the test point high index number from the lookup table entry that specifies the reference voltage operating point.

At step 122, the computer determines whether the direction variable indicates increasing or decreasing values of the modulating voltage amplitude. The direction variable at this point indicates whether increasing or decreasing values of the modulating voltage amplitude were used to populate the buffer memory with the breakup times.

In the numerical example, the direction variable indicates increasing values of the modulating voltage amplitude, because the buffer memory was populated by storing the breakup times corresponding to the voltage operating points specified by lookup table entries index numbers 167 to 181. The current voltage operating point is 149.1 V, i.e., the voltage operating point specified by lookup table entry index number 181.

If the direction variable indicates increasing values of the modulating voltage amplitude, operation proceeds to step 124. Otherwise, operation proceeds to step 126.

At step 124, the computer determines whether the test point low index number specified by the lookup table entry containing the current reference voltage operating point is different from the test point low index number specified by the lookup table entry containing the initial or previous reference voltage operating point.

If the test point low index numbers are different, operation proceeds to step 128.

At step 128 the computer deletes from the buffer memory any breakup time corresponding to a voltage operating point lower than the voltage operating point specified by the lookup table entry identified by the test point low index number of the lookup table entry containing the current reference voltage operating point. Operation then proceeds to step 130.

In the numerical example the buffer memory contains the breakup times corresponding to the voltage operating points specified by lookup table entries index numbers 167 to 181. The lookup table entry containing the current reference voltage operating point is entry index number 175, which specifies a test point low index number of 168. The voltage operating point of 137 V specified by lookup table entry index number 167 is lower than the voltage operating point of 138 V specified by entry index number 168. At step 128, therefore, the computer deletes the breakup time corresponding to the voltage operating point of 137 V from the buffer memory.

If the test point low index numbers are the same, operation proceeds directly from step 124 to step 130.

At step 130 the computer determines whether the test point high index number specified by the lookup table entry containing the current reference voltage operating point is different from the test point high index number specified by the lookup table entry containing the initial or previous voltage operating point.

If the test point high index numbers are different, operation proceeds to step 132. Otherwise, operation returns to step 116.

At step 132 the computer looks up the next voltage operating point above the current voltage operating point. The computer causes a modulating voltage with an amplitude of the next voltage operating point above the current voltage operating point to be applied to the piezoelectric element 54 and carries out phasing and measurement of the breakup time at the new voltage operating point. The computer stores the breakup time in the buffer memory. Operation proceeds to step 134.

In the numerical example the buffer memory contains the breakup times corresponding to the voltage operating points specified by lookup table entries index numbers 168 to 181. The lookup table entry containing the current reference voltage operating point is entry index number 175, which specifies a test point high index number of 182. The test point high index number of 182 specified by entry index number 175 is different from the test point high index number of 181 specified by entry index number 174. The computer therefore looks up the next voltage operating point above the current voltage operating point of 149.1 V, namely 149.9 V as specified by lookup table entry index number 182.

The computer applies the DAC level of 795 specified by lookup table entry index number 182 to the DAC, which causes a modulating voltage with an amplitude of 149.9 V to be applied to the piezoelectric element 54. The computer stores the breakup time corresponding to the voltage operating point of 149.9 V in the buffer memory, which thus contains the breakup times corresponding to the voltage operating points specified by lookup table entries index numbers 168 to 182.

At step 134 the computer determines whether the current voltage operating point is that specified by the lookup table entry identified by the test point high index number. If not, operation returns to step 132.

In the numerical example, the computer determines whether the current voltage operating point is that specified by lookup table entry index number 182, i.e., 149.9 V, as lookup table entry index number 182 is specified by lookup table entry number 175, which contains the current reference voltage operating point.

Returning to step 126, to which operation proceeds if the direction variable indicates decreasing values of the modulating voltage amplitude, the computer clears all of the breakup times from the buffer memory other than the breakup time corresponding to the current voltage operating point. The computer sets the direction variable to indicate that increasing values of the modulating voltage amplitude are to be used to populate the buffer memory with breakup times.

In the numerical example, the buffer memory would contain the breakup times corresponding to the voltage operating points specified by lookup table entries index numbers 167 to 181. The current voltage operating point is 137 V, as specified by lookup table entry index number 167 (the buffer memory would have been populated using decreasing values of the modulating voltage amplitude.) The computer therefore deletes from the buffer memory all of the breakup times other than the breakup time corresponding to the current voltage operating point of 137 V.

The computer determines whether the test point low index number specified by the lookup table entry containing the current reference voltage operating point is different from the test point low index number specified by the lookup table entry containing the previous reference voltage operating point. (Operation can only proceed to step 126 once the computer has established a reference voltage operating point, rather than the initial voltage operating point, because the buffer memory is always populated using increasing values of the modulating voltage amplitude upon establishment of the initial voltage operating point.)

If the test point low numbers are different, operation proceeds to step 136. Otherwise, operation proceeds directly to step 132.

At step 136 the computer deletes from the buffer memory the breakup time corresponding to the current voltage operating point. Operation proceeds to step 132.

In the numerical example the buffer memory contains the breakup time corresponding to the voltage operating point specified by lookup table entry index number 167. The lookup table entry containing the current reference voltage operating point is entry index number 175, which specifies a test point low index number of 168. The test point low index number of 168 specified by entry index number 175 is different from the test point low index number of 167 specified by entry index number 174. The computer therefore deletes the breakup time corresponding to the voltage operating point specified by entry index number 167. At this point the buffer memory is empty.

Steps 132 and 134 have been described previously.

Returning to the numerical example, at step 132 the next voltage operating point above the current voltage operating point of 137 V is 138 V, as specified by lookup table entry index number 168. The computer applies the DAC level of 823 specified by lookup table entry index number 168 to the DAC, which causes a modulating voltage with an amplitude of 138 V to be applied to the piezoelectric element 54.

The computer stores the breakup time corresponding to the voltage operating point of 138 V in the buffer memory.

At step 134 the computer determines whether the current voltage operating point of 138 V is that specified by lookup table entry index number 182, i.e., 149.9 V, as lookup table entry index number 182 is specified by lookup table entry index number 175, which contains the current reference voltage operating point.

Operation loops through steps 132 and 134 until the computer determines that the current voltage operating point of 149.9 V is that specified by lookup table entry index number 182. At this point the buffer memory contains the breakup times corresponding to the voltage operating points specified by lookup table entries index numbers 168 to 182.

Finally, operation returns to step 116 for calculation of a new best fit line and gradient of the best fit line.

Figure 3B:
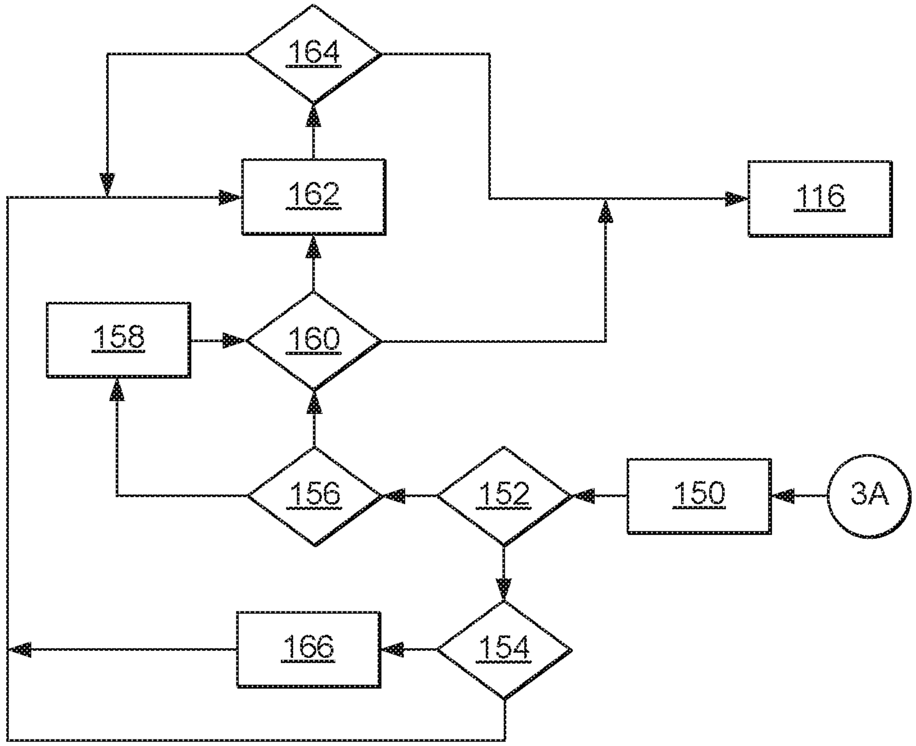

Turning now to the case that the gradient of the best fit line is less than the predetermined gradient and referring to FIG. 3B, at step 150 the computer looks up the next voltage operating point below the initial or current reference voltage operating point, as the case may be.

In the numerical example, the next voltage operating point below the initial operating point of 143.3 V is 142.5 V, as specified by lookup table entry index number 173.

The computer stores the next voltage operating point below the initial or current reference voltage operating point as the reference voltage operating point and obtains the test point low and high index numbers from the lookup table entry that specifies the reference voltage operating point.

Returning to the numerical example, the computer stores the reference voltage operating point of 142.5 V specified by lookup table entry index number 173, which specifies test point low and high index number values of 166 and 180 and a buffer size of 15.

At step 152, the computer determines whether the direction variable indicates increasing or decreasing values of the modulating voltage amplitude. The direction variable at this point indicates whether increasing or decreasing values of the modulating voltage amplitude were used to populate the buffer memory with the breakup times.

In the numerical example, the direction variable indicates increasing values of the modulating voltage amplitude, because the buffer memory was populated by storing the breakup times corresponding to the voltage operating points specified by lookup table entries index numbers 167 to 181. The current voltage operating point is 149.1 V, i.e., the voltage operating point specified by lookup table entry index number 181.

If the direction variable indicates increasing values of the modulating voltage amplitude, operation proceeds to step 154. Otherwise, operation proceeds to step 156.

At step 154, the computer clears all of the breakup times from the buffer memory other than the breakup time corresponding to the current voltage operating point. The computer sets the direction variable to indicate that decreasing values of the modulating voltage amplitude are to be used to populate the buffer memory with breakup times.

In the numerical example, the buffer memory contains the breakup times corresponding to the voltage operating points specified by lookup table entries index numbers 167 to 181. The current voltage operating point is 149.1 V, as specified by lookup table entry index number 181. The computer therefore deletes from the buffer memory all of the breakup times other than the breakup time corresponding to the current voltage operating point of 149.1 V.

The computer determines whether the test point high index number specified by the lookup table entry containing the current reference voltage operating point is different from the test point high index number specified by the lookup table entry containing the previous reference voltage operating point.

If the test point high index numbers are different, operation proceeds to step 166. Otherwise, operation proceeds directly to step 162.

At step 166 the computer deletes from the buffer memory the breakup time corresponding to the current voltage operating point. Operation proceeds to step 162.

In the numerical example the buffer memory contains the breakup time corresponding to the voltage operating point specified by lookup table entry index number 181. The lookup table entry containing the current reference voltage operating point is entry index number 173, which specifies a test point high index number of 180. The test point high index number of 180 specified by entry index number 173 is different from the test point high index number of 181 specified by entry index number 174. The computer therefore deletes the breakup time corresponding to the voltage operating point specified by entry index number 181, leaving the buffer memory empty.

At step 162 the computer looks up the next voltage operating point below the current voltage operating point. The computer causes a modulating voltage with an amplitude of the next voltage operating point below the current voltage operating point to be applied to the piezoelectric element 54 and carries out phasing and measurement of the breakup time at the new voltage operating point. The computer stores the breakup time in the buffer memory. Operation proceeds to step 164.

Returning to the numerical example, at step 162 the next voltage operating point below the current voltage operating point of 149.1 V is 148.2 V, as specified by lookup table entry index number 180.

The computer applies the DAC level of 799 specified by lookup table entry index number 180 to the DAC, which causes a modulating voltage with an amplitude of 148.2 V to be applied to the piezoelectric element 54.

The computer stores the breakup time corresponding to the voltage operating point of 148.2 V in the buffer memory.

At step 64 the computer determines whether the current voltage operating point is that specified by the lookup table entry identified by the test point low index number. If not, operation returns to step 162.

In the numerical example, the computer determines whether the current voltage operating point is that specified by lookup table entry index number 166, i.e., 136 V, as lookup table entry index number 166 is specified by lookup table entry index number 173, which contains the current reference voltage operating point.

Returning to step 156, to which operation proceeds if the direction variable indicates decreasing values of the modulating voltage, the computer determines whether the test point high index number specified by the lookup table entry containing the current reference voltage operating point is different from the test point high index number specified by the lookup table entry containing the initial or previous reference voltage operating point.

If the test point high index numbers are different, operation proceeds to step 158.

At step 158 the computer deletes from the buffer memory any breakup time corresponding to a voltage operating point higher than the voltage operating point specified by the lookup table entry identified by the test point high index number of the lookup table entry containing the current reference voltage operating point. Operation then proceeds to step 160.

In the numerical example the buffer memory contains the breakup times corresponding to the voltage operating points specified by lookup table entries index numbers 167 to 181. The lookup table entry containing the current reference voltage operating point is entry index number 173, which specifies a test point high index number of 180. The voltage operating point of 149.1 V specified by lookup table entry index number 181 is higher than the voltage operating point of 148.2 V specified by entry index number 180. At step 158, therefore, the computer deletes the breakup time corresponding to the voltage operating point of 149.1 V from the buffer memory.

If the test point high index numbers are the same, operation proceeds directly from step 156 to step 160.

At step 160 the computer determines whether the test point low index number specified by the lookup table entry containing the current reference voltage operating point is different from the test point low index number specified by the lookup table entry containing the initial or previous voltage operating point.

If the test point low index numbers are different, operation proceeds to step 162. Otherwise, operation returns to step 116.

At step 162 the computer looks up the next voltage operating point below the current voltage operating point. The computer causes a modulating voltage with an amplitude of the next voltage operating point below the current voltage operating point to be applied to the piezoelectric element 54 and carries out phasing and measurement of the breakup time at the new voltage operating point. The computer stores the breakup time in the buffer memory. Operation proceeds to step 164.

In the numerical example the buffer memory contains the breakup times corresponding to the voltage operating points specified by lookup table entries index numbers 167 to 180. The lookup table entry containing the current reference voltage operating point is entry index number 173, which specifies a test point low index number of 166. The test point low index number of 166 specified by entry index number 173 is different from the test point low index number of 167 specified by entry index number 174. The computer therefore looks up the next voltage operating point below the current voltage operating point of 137 V, namely 136 V as specified by lookup table entry index number 166.

The computer applies the DAC level of 827 specified by lookup table entry index number 166 to the DAC, which causes a modulating voltage with an amplitude of 136 V to be applied to the piezoelectric element 54. The computer stores the breakup time corresponding to the voltage operating point of 136 V in the buffer memory, which thus contains the breakup times corresponding to the voltage operating points specified by lookup table entries index numbers 166 to 180.

At step 164 the computer determines whether the current voltage operating point is that specified by the lookup table entry identified by the test point low index number. If not, operation returns to step 162.

In the numerical example, the computer determines whether the current voltage operating point is that specified by lookup table entry index number 166, i.e., 136 V, as lookup table entry index number 166 is specified by lookup table entry number 173, which contains the current reference voltage operating point.

Otherwise, operation returns to step 116 for calculation of a new best fit line and gradient of the best fit line.

It will be appreciated that although the voltage operating point changes continuously, the reference voltage operating point selected at either step 120 or 150 effectively tracks changes in the breakup time against modulating voltage amplitude characteristic so as to cause the voltage operating point to vary around a point of the characteristic that has the predetermined gradient.

FIG. 4 shows that from one lookup table entry to the next, the DAC level decreases by two. That is, the DAC level values available to the computer from the portion 200 of the lookup table are a subset of those receivable by the DAC, namely the odd DAC level values from 829 to 789. This gives a difference of as close to 1 V as possible between the voltage operating points of consecutive lookup table entries.

Portion 200 of the lookup table shown in FIG. 4 shows that the buffer sizes, i.e., the number of voltage operating points used to calculate the gradient of the portion of the breakup time against modulating voltage amplitude characteristic for a voltage operating point increases with the modulating voltage amplitude. For example, lookup table entry index number 167 uses 13 voltage operating points, whereas lookup table entry index number 181 uses 16 such operating points. Given that the differences between the voltage operating points of consecutive lookup table entries are arranged to be as close to 1 V as possible, the increasing buffer sizes must result in ranges over which the modulating voltage amplitude is varied that increase with the modulating voltage amplitudes.

It will be appreciated that the above description relates only to one embodiment of the invention, and that the invention encompasses other embodiments as defined by the claims.

The invention claimed is:

1. A continuous inkjet (CIJ) printer comprising an ink droplet generator including an electromechanical transducer, a driver operable to apply a periodic modulating voltage to the transducer to cause a jet of ink ejected by the ink droplet generator to break up into a stream of ink droplets at a breakup time after ejection from the ink droplet generator, and a controller operable to vary a modulating voltage parameter of the modulating voltage and measure corresponding values of a breakup time parameter indicative of the breakup time to obtain a portion of a characteristic of the breakup time parameter against the modulating voltage parameter, wherein the controller is operable to obtain a variation range, to vary the modulating voltage parameter over the variation range to obtain the portion of the characteristic, to calculate a gradient from the portion of the characteristic, to compare the calculated gradient with a predetermined gradient and, if the calculated gradient is less than the predetermined gradient, to generate an adjusted variation range that is displaced relative to the variation range in a first sense, or, if the calculated gradient is greater than the predetermined gradient, to generate an adjusted variation range that is displaced relative to the variation range in a second sense, opposite to the first sense.

2. A CIJ printer according to claim 1, wherein the modulating voltage parameter is an amplitude of the modulating voltage.

3. A CIJ printer according to claim 2, wherein the variation range has a size that increases with the modulating voltage amplitudes that constitute the portion of the characteristic.

4. A CIJ printer according to claim 1, wherein the controller is operable to calculate the gradient from the portion of the characteristic by identifying a line of best fit to the portion and calculating the gradient of the line of best fit.

5. A CIJ printer according to claim 1, wherein the breakup time parameter is a breakup time at least indicative of a time after which ink jetted from a nozzle of the ink droplet generator separates into an ink droplet.

6. A CIJ printer according to claim 1, wherein the controller is operable to store the adjusted variation range in a variation range memory of the printer, and to obtain the variation range from the variation range memory.

7. A CIJ printer according to claim 1, wherein the driver includes a digital-to-analog converter (DAC) and the controller is configured to apply binary input signals to the DAC, which binary input signals are selected from a subset of the set of binary input signals receivable by the DAC, the subset being chosen such that output voltages produced by the DAC in response to the binary input signals differ from one another by approximately equal amounts.

8. A CIJ printer according to claim 7, wherein the subset is chosen such that output voltages produced by the DAC in response to the binary input signals differ from one another by an amount as close to 1 V as possible.

9. A CIJ printer according to claim 1, wherein the printer includes a memory containing a lookup table specifying variation range sizes of the portions of the characteristic and each entry of the lookup table includes a value of the modulating voltage parameter and an indication of those lookup table entries of which the values of the modulating voltage parameter constitute the portion of the characteristic.

10. A CIJ printer according to claim 9, wherein each entry of the lookup table includes an index number that identifies the entry, a value of the modulating voltage parameter, and first and second index numbers defining respective first and second ends of the portion of the characteristic, the portion of the characteristic being defined by the values of the modulating voltage parameter of the lookup table entries identified by the first and second index numbers.

11. A CIJ printer according to claim 9, wherein the entries of the lookup table are ordered by the values of the modulating voltage parameter and each entry of the lookup table includes an indication of first and second entries defining respective first and second ends of a portion of the lookup table, the values of the modulating voltage parameter of the lookup table entries of the portion of the lookup table constituting the portion of the characteristic.

12. A CIJ printer according to claim 1, wherein the controller is operable, for each value of the modulating voltage parameter, to measure the corresponding breakup time parameter value at least twice and calculate an average breakup time parameter value from the measured breakup time parameter values.

13. A CIJ printer according to claim 12, wherein the printer is configured to receive an input indicative of a speed of a production line, and to vary a number of times that a breakup time parameter value corresponding to a value of the modulating voltage parameter is measured in dependence upon the input.

14. A method of operating a continuous inkjet printer, the method comprising applying a periodic modulating voltage to an electromechanical transducer of an ink droplet generator to cause a jet of ink ejected by the ink droplet generator to break up into a stream of ink droplets at a breakup time after ejection from the ink droplet generator, varying a modulating voltage parameter of the modulating voltage and measuring corresponding values of a breakup time parameter indicative of the breakup time to obtain a portion of a characteristic of the breakup time parameter against the modulating voltage parameter, wherein the method comprises obtaining a variation range, varying the modulating voltage parameter over the variation range to obtain the portion of the characteristic, calculating a gradient from the portion of the characteristic, comparing the calculated gradient with a predetermined gradient and, if the calculated gradient is less than the predetermined gradient, generating an adjusted variation range that is displaced relative to the variation range in a first sense, or, if the calculated gradient is greater than the predetermined gradient, generating an adjusted variation range that is displaced relative to the variation range in a second sense, opposite to the first sense.

15. A computer program executable by a continuous inkjet printer to cause the printer to carry out the method of claim 14.

* * * * *